United States Patent
Webb

(10) Patent No.: US 7,369,914 B2
(45) Date of Patent: May 6, 2008

(54) METHOD FOR PROJECTING BUILD PROGRESSION FOR A PRODUCT IN A MANUFACTURING ENVIRONMENT

(75) Inventor: Bradley D. Webb, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 0 days.

(21) Appl. No.: 11/486,886

(22) Filed: Jul. 14, 2006

(65) Prior Publication Data

US 2008/0015722 A1    Jan. 17, 2008

(51) Int. Cl.
*G06F 19/00*    (2006.01)

(52) U.S. Cl. .................... 700/100; 700/117; 703/6

(58) Field of Classification Search ............. 700/97, 700/99, 100, 101, 105, 121, 102, 109, 117; 701/14; 703/6
See application file for complete search history.

(56) References Cited

U.S. PATENT DOCUMENTS

| | | | |
|---|---|---|---|
| 5,444,632 A | | 8/1995 | Kline et al. |
| 5,521,828 A | | 5/1996 | Ueda |
| 5,586,021 A | * | 12/1996 | Fargher et al. ............. 700/100 |
| 5,745,364 A | | 4/1998 | Togashi |
| 5,801,945 A | * | 9/1998 | Comer ....................... 700/100 |
| 6,128,588 A | | 10/2000 | Chacon |
| 6,134,482 A | | 10/2000 | Iwasaki |
| 6,351,686 B1 | | 2/2002 | Iwasaki et al. |
| 6,463,350 B2 | | 10/2002 | Fukuda et al. |
| 6,496,747 B1 | | 12/2002 | Suzuki |
| 6,748,287 B1 | * | 6/2004 | Hagen et al. ................. 700/99 |
| 6,839,601 B1 | | 1/2005 | Yazback et al. |
| 6,856,848 B2 | * | 2/2005 | Matsumoto et al. ........ 700/101 |

FOREIGN PATENT DOCUMENTS

| | | |
|---|---|---|
| JP | 1109059 | 4/1989 |
| JP | 4347769 | 12/1992 |
| JP | 6203042 | 7/1994 |
| JP | 7153815 | 6/1995 |
| JP | 2001209421 | 8/2001 |

OTHER PUBLICATIONS

"Kicking Semiconductor Production up a Notch" Invensys Hotlinks (Summer 2003) pp. 45ff.
"Micrel Semiconductor Increases Productivity, Enhances Customer Service and Creates Smooth Production Flow with Wongerware's InTrack MES Software" Invensys Wonderware (2003).
Detlef Pabst, et al. "Deterministic Scheduling of Wafer Fab Operations" Brooks Worldwide Automation Symposium (2003) pp. 1-10.
Karen A. Pitts "Discrete-event simulation of wafer fabrication facility" Proceedings of the 188 Winter Simulation Conference (1988) pp. 712ff.

* cited by examiner

*Primary Examiner*—Zoila Cabrera
*Assistant Examiner*—Douglas S Lee
(74) *Attorney, Agent, or Firm*—Duke Amaniampong

(57) ABSTRACT

A computer implemented method is used for determining a product build schedule for sequential fabrication steps. The computer implemented method comprises: receiving a routing of the sequential fabrication steps; assigning a raw process time to a fabrication step in the routing; generating a cycle time for the fabrication step; receiving a start date for the sequential fabrication steps; and computing a projected shipping date for the product.

17 Claims, 4 Drawing Sheets

| | 415 | 417 | 419 | 360 | 420 | 424 | 426 | 237 | 440 | 430 |
|---|---|---|---|---|---|---|---|---|---|---|
| | | | | | 422 | | | | | |
| Step # | OP | Operation Description | ERN 24423P | RPT8 | RPT8 (hrs) | RPT8 (days) | CT Detractor (Days) | CT Multiplier | CTM X RPT8(days) + Detractors |
| 200 | 2730 | Inspect | 3/23/09 14:30 | 25.000 | 0.417 | 0.017 | | 1.5 | 0.026 |
| 201 | 2750 | Sputter | 3/23/09 15:07 | 77.000 | 1.283 | 0.053 | 0.5 | 1.5 | 0.580 |
| 202 | 2759 | Measure | 3/24/09 5:03 | 21.333 | 0.356 | 0.015 | | 1.5 | 0.022 |
| 203 | 2775 | Remove | 3/24/09 5:35 | 23.000 | 0.383 | 0.016 | | 1.5 | 0.024 |
| 204 | 2780 | Inspect | 3/24/09 6:09 | 25.000 | 0.417 | 0.017 | | 1.5 | 0.026 |
| 205 | 2787 | Clean | 3/24/09 6:47 | 20.667 | 0.344 | 0.014 | | 1.5 | 0.022 |
| 206 | 2790 | Sputter | 3/24/09 7:18 | 42.000 | 0.700 | 0.029 | | 1.5 | 0.044 |
| 207 | 2795 | Measure | 3/24/09 8:21 | 20.000 | 0.333 | 0.014 | | 1.5 | 0.021 |
| 208 | 2920 | Bake / Apply | 3/24/09 8:51 | 45.000 | 0.750 | 0.031 | 0.33 | 1.5 | 0.377 |
| 209 | 2930 | Expose | 3/24/09 17:53 | 25.000 | 0.417 | 0.017 | | 1.5 | 0.026 |
| 210 | 2940 | Develop | 3/24/09 18:31 | 45.000 | 0.750 | 0.031 | | 1.5 | 0.047 |
| 211 | 2950 | Inspect | 3/24/09 19:38 | 21.000 | 0.350 | 0.015 | | 1.5 | 0.022 |
| 212 | 2960 | Pre Bake | 3/24/09 20:10 | 36.000 | 0.600 | 0.025 | | 1.5 | 0.038 |
| 213 | 2970 | Inspect | 3/24/09 21:04 | 23.000 | 0.383 | 0.016 | | 1.5 | 0.024 |
| 214 | 2980 | Strip | 3/24/09 21:38 | 21.000 | 0.350 | 0.015 | | 1.5 | 0.022 |
| 215 | 2990 | Inspect | 3/24/09 22:10 | 20.000 | 0.333 | 0.014 | | 1.5 | 0.021 |
| 216 | 2800 | Etch & Sputter | 3/24/09 22:40 | 26.000 | 0.433 | 0.018 | | 1.5 | 0.027 |
| 217 | 1592 | Bake / Apply | 3/24/09 23:19 | 32.000 | 0.533 | 0.022 | | 1.5 | 0.033 |
| 218 | 1594 | Expose | 3/25/09 0:07 | 45.000 | 0.750 | 0.031 | | 1.5 | 0.047 |
| 219 | 1596 | Develop | 3/25/09 1:14 | 28.000 | 0.467 | 0.019 | | 1.5 | 0.029 |
| 220 | 1598 | Inspect | 3/25/09 1:56 | 41.000 | 0.683 | 0.028 | | 1.5 | 0.043 |
| 221 | 1602 | Pre Etch | 3/25/09 2:58 | 36.000 | 0.600 | 0.025 | | 1.5 | 0.038 |
| 222 | 1604 | Etch | 3/25/09 3:52 | 22.000 | 0.367 | 0.015 | | 1.5 | 0.023 |
| 223 | 1606 | Strip | 3/25/09 4:25 | 22.000 | 0.367 | 0.015 | | 1.5 | 0.023 |
| 224 | 1607 | Inspect | 3/25/09 4:58 | 20.000 | 0.333 | 0.014 | | 1.5 | 0.021 |
| 225 | 3180 | Pre-Apply | 3/25/09 5:28 | 32.444 | 0.541 | 0.023 | | 1.5 | 0.034 |

METHOD FOR PROJECTING BUILD PROGRESSION FOR A PRODUCT IN A MANUFACTURING ENVIRONMENT

TECHNICAL FIELD

The embodiments in accordance with the present invention as presented relate generally to production control; and in particular a method of predicting the progression of a part or product through a build process.

BACKGROUND ART

The type of product does not limit the embodiments in accordance with the present invention. The following background art is an example of a product in which one embodiment, in accordance with the present invention, can be applied. One skilled in the art will recognize the multitude of products to which the embodiments of the present invention can be applied.

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

Shown in FIG. 1 is the relationship of components and sub-assemblies of HDD 110 and a representation of data tracks 136 recorded on disk surface 135. The cover is removed and not shown so that the inside of HDD 110 is visible. The components are assembled into base casting 113, which provides attachment and registration points for components and sub-assemblies. Data is recorded onto disk surface 135 in a pattern of concentric rings known as data tracks 136. Disk surface 135 is spun at fast revolutions by means of a motor-hub assembly 130. Data tracks 136 are recorded onto disk surface 135 by means of magnetic head 156, which typically resides at the end of slider 155. FIG. 1 being a plan view shows only one head and one disk surface combination. One skilled in the art understands that what is described for one head-disk combination applies to multiple head-disk combinations. The embodiment in accordance with the present invention is independent of number of head-disk combinations. Slider 155 and consequently head 156 are incorporated into head gimbal assembly (HGA) 150. HGA 150 is incorporated into actuator 140, which is comprised of at least one arm 146, pivot bearing 145, and voice coil 143. Arm 146 supports HGA 150 over disk surface 135. Pivot bearing 145 allows for smooth and precise rotation of actuator 140. Actuator 140 precisely moves HGA 150 over disk surface 135 by means of electro-motive force (emf) produced between voice coil 143 and magnets 125. Emf is a force that is produced when a current is passed through voice coil 143 and is in close proximity to magnets 125. Only bottom magnet 125 is shown. Top and bottom magnets 125 are joined as pole piece assembly 120. Pole piece assembly 120 in conjunction with voice coil 143 constitutes a voice coil motor (VCM). The VCM positions head 156 via actuator 140 by producing a controlled emf. Current is passed through voice coil 143 from controller 117. The required amount of current from controller 117, to produce the desired amount of emf, is determined by location information (stored in other electronic components not shown in FIG. 1) for data tracks 136 and location information stored in data tracks 136. Electronic commands for accessing data tracks 136 pass from controller 117 through flex cable 118 and into voice coil 143. Small corrections to the position of head 156 are determined from retrieved information from data tracks 136. This retrieved information is sent back to controller 117 so that small corrections can be made to the location and the appropriate current can be sent from controller 117 to voice coil 143. Once the desired data track is located, data is either retrieved or manipulated by means of electronic signals that pass through connector 111 and through flex cable 118. Connector 111 is the electronic interface that allows data to be transferred in and out of HDD 110.

The above cited art is exemplary of a product with components and process steps that must be coordinated into a build schedule to produce a final product. The given example of an HDD, in no way limits the embodiment, in accordance with the present invention, from being applied to any product requiring a product build schedule. One of the challenges for determining a product build schedule is the coordination of the fabrication, delivery, and assembly of the many components involved so that a final product can be produced in a timely and effective manner. Challenges become greater when a prototype part or process is introduced as a change to the final product. The scheduling of vendors, parts and support personnel to effectively produce the final product becomes a large challenge. Engineering judgment, which has been used in the past for estimating a build schedule for producing a final part, does not accurately predict the arrival time of a product in a manufacturing environment.

SUMMARY OF THE INVENTION

A computer implemented method is used for determining a product build schedule for sequential fabrication steps. The computer implemented method comprises: receiving a routing of the sequential fabrication steps; assigning a raw process time to a fabrication step in the routing; generating a cycle time for the fabrication step; receiving a start date for the sequential fabrication steps; and computing a projected shipping date for the product.

BRIEF DESCRIPTION OF THE DRAWINGS

The accompanying drawings, which are incorporated in and form a part of this specification, illustrate embodiments in accordance with the present invention and, together with the description, serve to explain the principles of embodiments in accordance with the present invention:

Prior Art

FIG. 4 is an exemplary segment of a spreadsheet for a product routing in accordance with an embodiment of the present invention.

DETAILED DESCRIPTION

In one embodiment, the present invention addresses the challenges presented by the cited prior art while achieving a cost effective means of assuring the function and performance of a manufactured part.

One embodiment in accordance with the present invention takes advantage of a variety of process information for individual fabrications steps in a build process. Once information regarding individual fabrication steps is delivered to the embodiment in accordance with the present invention, the sequential fabrication steps that define a build process are characterized. This characterization of the build process allows the embodiment in accordance with the present invention to produce projections of dates, times and other information regarding the arrival of the product at a particular fabrication step and the projected shipping date of the product. By mathematically manipulating the delivered process information, the embodiment in accordance with the present invention determines a product build schedule.

Figure 3:
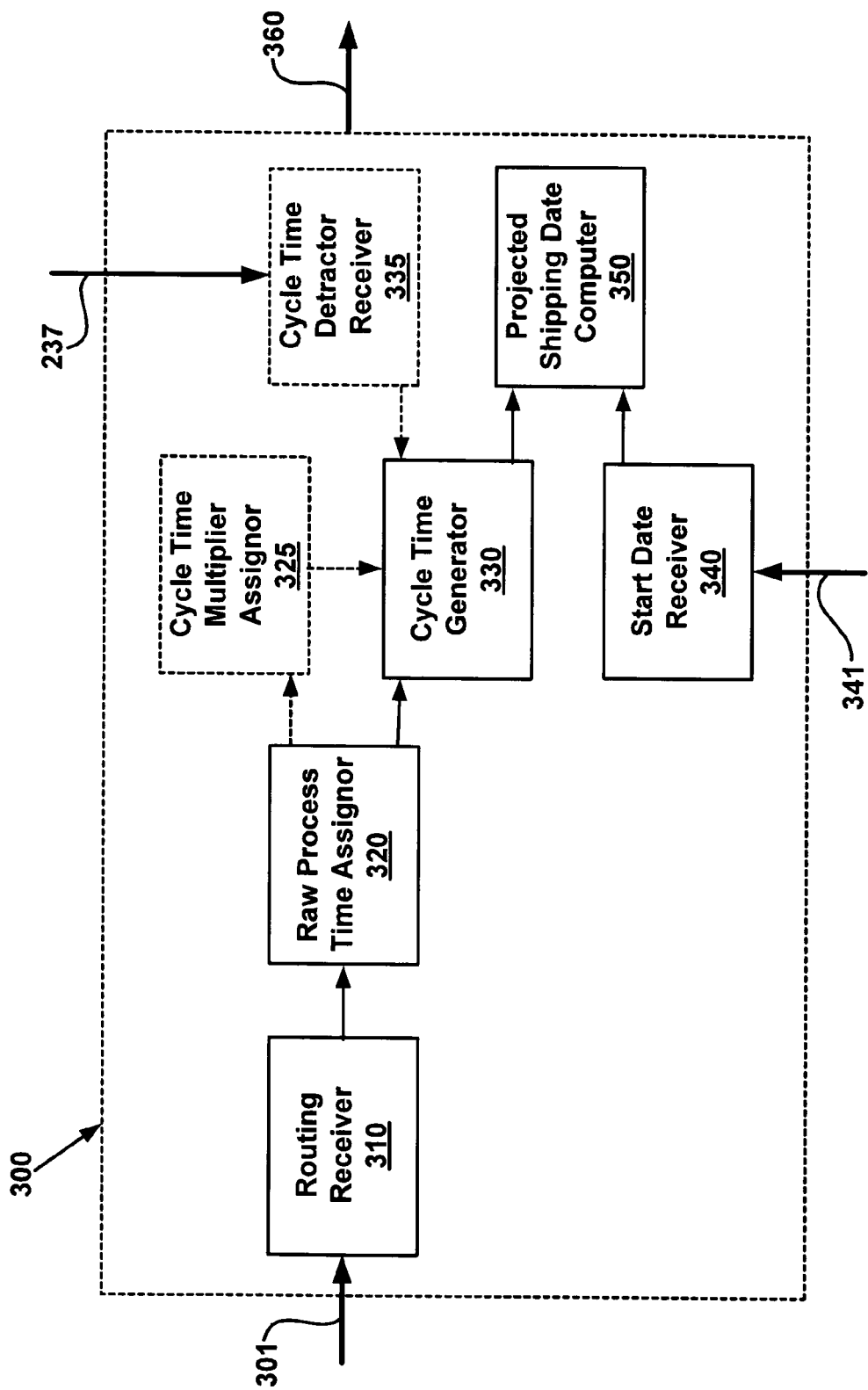
FIG. 3 is a schematic diagram representing a system for determining a product build schedule in accordance with an embodiment of the present invention.

With reference now to FIG. 3, a schematic diagram is shown of system 300 for determining a product build schedule in accordance with one embodiment of the present invention. The following discussion will begin with a description of the physical structure of the embodiment in accordance with the present invention. This discussion will then be followed with a description of the operation of the embodiment in accordance with the present invention.

PHYSICAL DESCRIPTION

With respect to the physical structure of the embodiment in accordance with the present invention, system 300 for determining a product build schedule is started when build initiation 301 is established. System 300 has a routing receiver 310 for the sequential fabrication steps 415 (as shown in FIG. 4). Routing receiver 310 receives, within build initiation 301, the order in which the sequential fabrication steps 415 are to be performed on the product. Routing receiver 310 presents the routing to raw process time assignor 320. Raw process time assignor 320 assigns the time required for a fabrication step to perform its function. When assigning a raw process time, raw process time assignor 320 excludes time required to perform supporting activity.

Under the condition that the product progressing through the build process is a change from the normal build process, (such as a prototype part, a prototype fabrication step, or a new product) cycle time multiplier assignor 325 assigns a multiplier into cycle time generator 330, thereby reflecting the degree of urgency for the product progressing through a build process. Under the condition that the product progressing through the build process is a production part from the normal build process, raw process time assignor 320 assigns a raw process time into cycle time generator 330. Cycle time generator 330 generates the time required for a fabrication step to perform its function as well as time required to perform supporting activity.

Under the condition that the product progressing through the build process is a change from the normal build process, (such as a prototype part, a prototype fabrication step, or a new product) cycle time detractor receiver 335, receives a cycle time detractor 237 and applies the cycle time detractor 237 into cycle time generator 330 thereby reflecting a change in the time required at a fabrication. Under the condition that the product progressing through the build process is a production part from the normal build process, cycle time generator 330 generates a cycle time for projected shipping date computer 350. Start date receiver receives start date 341 and delivers start date 341 to projected shipping date computer 350. A projected shipping date 360 is computed by projected shipping date computer 350.

FIG. 4 shows an exemplary segment of a spreadsheet 400 for a product routing in accordance with another embodiment of the present invention. It is recognized by those skilled in the art that the columns in a spreadsheet can be arranged in any order to facilitate the presentation of the information within the embodiment in accordance with the present invention. The arrangement of columns in the embodiment in accordance with the present invention by no means implies a specific order to the steps in the embodied invention. Product routing 410 consists of: sequential fabrication step order list 415 that defines the order in which fabrication steps 417 are to be run; fabrication step identifiers 417, which identifies the operational steps numerically, which can facilitate computer recognition of the fabrication steps; and fabrication step descriptions 419, which identifies the operational steps in text that can facilitate human recognition of the fabrication steps. Projected shipping date 360 is the result of the embodiment in accordance with the present invention. Some examples of what projected shipping date 360 can be used for are: schedule skilled personnel at a fabrication step requiring attention; schedule resources to be ready when a product arrives at a fabrication step; inform a customer when a product will be available; and measure the effectiveness of a change to routing 410. One skilled in the art will realize many other uses for the embodiment in accordance with the present invention. Exemplified in raw process time assignor 420 are three examples of the format that raw process times can have. Raw process time 422 is in the form of minutes; raw process time 424 is in the form of hours; and raw process time 426 is in the form of days. Cycle time detractor 237 is in the form of days. Cycle time multiplier 440, cycle time detractor 237, and raw process time assignor 420 are combine in a mathematical algorithm to generate cycle time 430 (in FIG. 4, exemplified in days).

IN OPERATION

The following discussion sets forth in detail the operation of the embodiment in accordance with the present invention. As shown in schematic diagram FIG. 3, in one embodiment in accordance with the present, system 300 for determining a product build schedule is used to project the build progression for a product through a series of sequential fabrication steps.

Figure 1:
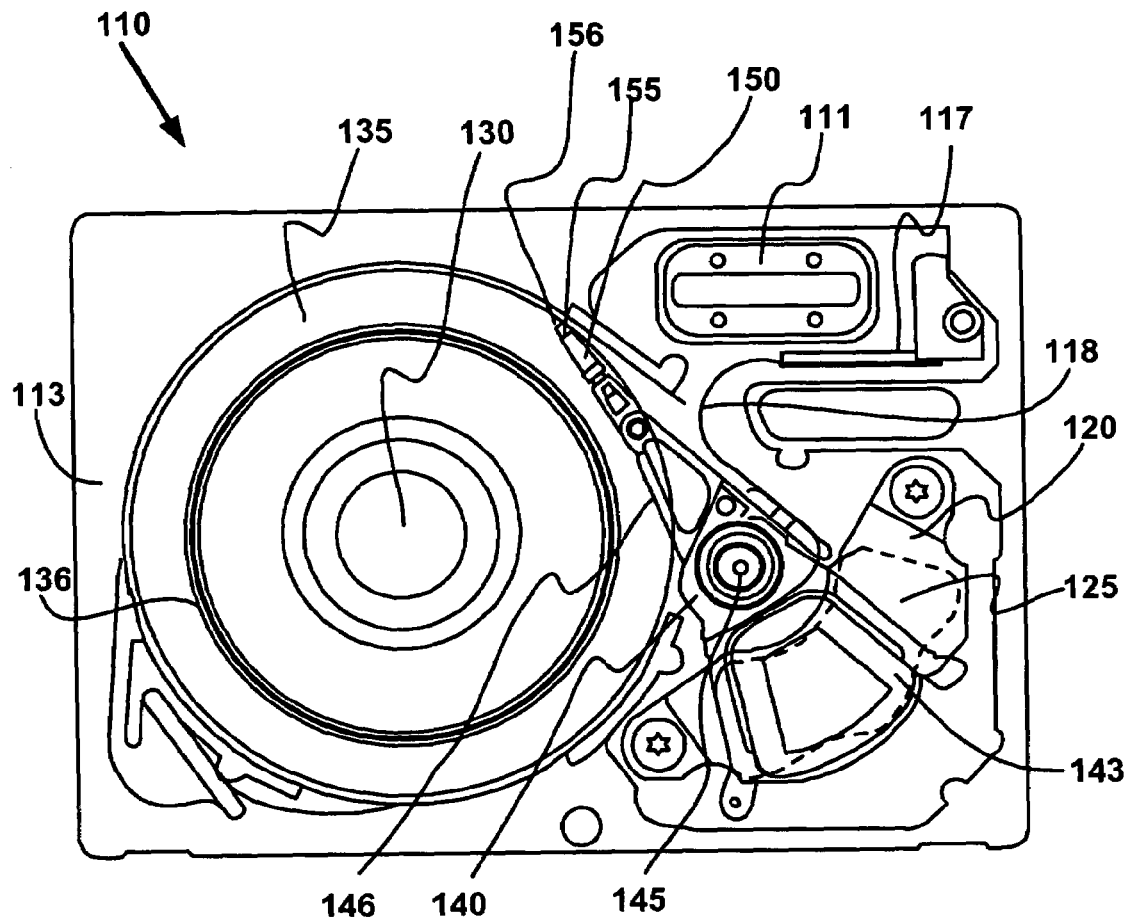
FIG. 1 is a plan view of an HDD with cover and top magnet removed.
Figure 2:
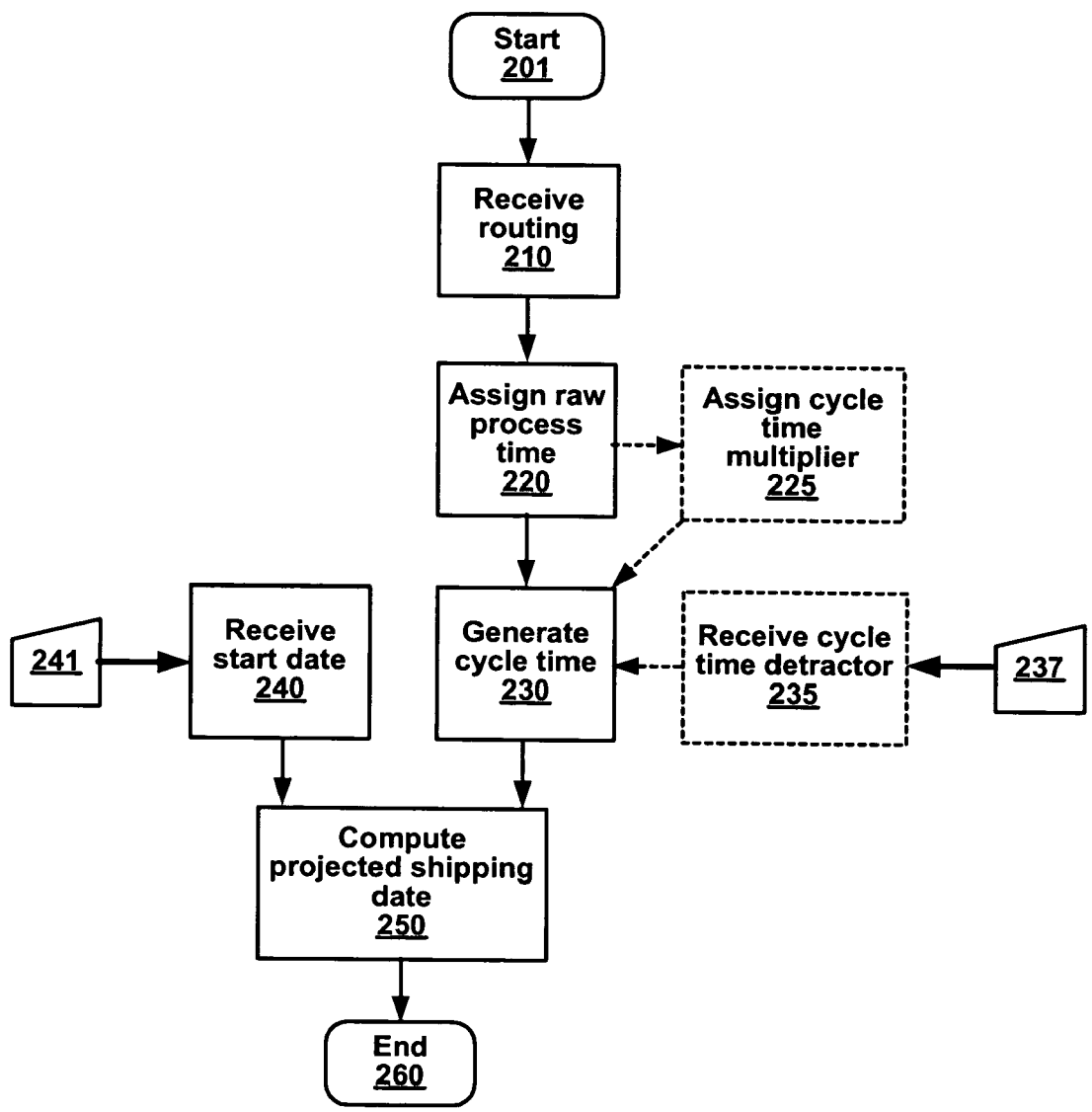
FIG. 2 is a flow chart illustrating steps of a method for determining a product build schedule in accordance with an embodiment of the present invention.

FIG. 2 is a flow chart of method 200 in which particular steps are performed in accordance with another embodiment of the present invention for determining a product build schedule. Method 200 is performed for at least one fabrication step as shown in FIG. 4. FIG. 2 includes methods of the embodiment in accordance with the present invention, which in one embodiment, are carried out by processors, electrical components and assembly mechanisms under the control of computer readable and computer executable instructions. The computer readable and computer executable instructions reside, for example, in data storage features such as a computer usable volatile memory and/or a computer usable non-volatile memory and/or a data storage device. However, the computer readable and computer executable instructions may reside in any type of computer readable medium. Although specific steps are disclosed in method 200, such steps are exemplary. That is, the embodiment in accordance with the present invention is well suited to performing various other steps or variations of the steps recited in FIG. 2. Within the present embodiment, it should be appreciated that the steps of method 200 may be performed by software, by hardware, by an assembly mechanism, through human interaction, or by any combination of software, hardware, assembly mechanism, and human interaction.

In step 201 of method 200 as shown in FIG. 2, initiation of the build is established and the method for determining a product build schedule starts, in an embodiment in accordance with the present invention.

In step 210 of method 200 as shown in FIG. 2, a routing of the sequential fabrication steps (as shown in FIG. 4) is received, in an embodiment in accordance with the present invention. The routing describes the sequence of fabrication steps for fabricating the product.

In step 220 of method 200 as shown in FIG. 2, a raw process time for at least one of the individual fabrication steps (as shown in FIG. 4) is assigned, in an embodiment in accordance with the present invention. The raw process time is the time required for a fabrication step to perform its function, and excludes time required to perform supporting activity. Examples of supporting activity are transporting the product, documenting the product, and reworking the product.

In step 225 of method 200 as shown in FIG. 2, a cycle time multiplier for at least one of the individual fabrication steps (as shown in FIG. 4) is assigned, in an embodiment in accordance with the present invention. The cycle time multiplier is a multiplier applied to generating a cycle time in step 230, which reflects the degree of urgency for the product progressing through a build process and therefore either increases or decreases the amount of time allowed for the product progressing through a build process. The cycle time multiplier is typically applied to generating a cycle time in step 230 when a change from the normal build process, is introduced such as a prototype part, a prototype fabrication step, or a new product.

In step 230 of method 200 as shown in FIG. 2, a cycle time for at least one of the individual fabrication steps (as shown in FIG. 4) is generated, in an embodiment in accordance with the present invention. The cycle time is the time required for a fabrication step to perform its function as well as time required to perform supporting activity. Examples of supporting activity are transporting the product, documenting the product, and reworking the product. Generating cycle time in step 230 is influenced by the cycle time multiplier assigned in step 225.

In step 235 of method 200 as shown in FIG. 2, a cycle time detractor 237 for at least one of the individual fabrication steps (as shown in FIG. 4) is received, in an embodiment in accordance with the present invention. Cycle time detractor 237 is a multiplier applied to the cycle time in step 230, which reflects a change in the time required at a fabrication step. Cycle time detractor 237 is typically applied to the cycle time in step 230 when a change from the normal build process is being introduced, such as a prototype part, a prototype fabrication step, or a new product. Cycle time detractor 237 can either increase or decrease the cycle time depending on the nature of the change that is being introduced to the normal build process. The cycle time that is generated in step 230 is regenerated with the received cycle time detractor 237 in step 235.

In step 240 of method 200 as shown in FIG. 2, a start date 241 for at least one of the individual fabrication steps (as shown in FIG. 4) is received, in an embodiment in accordance with the present invention. Start date 241 is the point in time that a fabrication step will be available to process the product.

In step 250 of method 200 as shown in FIG. 2, a projected shipping date 360 (as shown in FIG. 3 and 4) for at least one of the individual fabrication steps (as shown in FIG. 4) is computed, in an embodiment in accordance with the present invention. Shipping date 360 is the point in time wherein the product has been processed through a fabrication step and is available to proceed to the next fabrication step. One skilled in the art will realize that shipping date 360 for the last fabrication step is the point in time that the product is complete.

In step 260 of method 200 as shown in FIG. 2, method 200 for determining a product build schedule ends.

Advantageously, the various presented embodiments in accordance with the present invention allow for the embodiments to produce projections of dates and times for when the product will be at a particular fabrication step and the projected shipping date of the product. One embodiment in accordance with the present invention allows inquiries into the progress of a product at any step in product routing 410 as well as allowing graphical presentation of the progress of a product. This is beneficial for the timely scheduling of parts, resources, and required special attention.

The foregoing descriptions of specific embodiment in accordance with the present invention have been presented for purposes of illustration and description. They are not intended to be exhaustive or to limit the embodiments, in accordance with the present invention, to the precise forms disclosed, and obviously many modifications and variations are possible in light of the above teaching. The embodiments were chosen and described in order to best explain the principles of the embodiments, in accordance with the present invention, and its practical application, to thereby enable others skilled in the art to best utilize the embodiments in accordance with the present invention with various modifications as are suited to the particular use contemplated. It is intended that the scope of the embodiments in accordance with the present invention be defined by the Claims appended hereto and their equivalents.

What is claimed is:

1. A computer implemented method for determining a product build schedule for sequential fabrication steps, said computer implemented method comprising:

receiving a routing of said sequential fabrication steps;
assigning a raw process time to a fabrication step in said routing;
generating a cycle time for said fabrication step;
assigning a cycle time multiplier to said fabrication step;
receiving a start date for said sequential fabrication steps; and
computing a projected shipping date for said product.

2. The computer implemented method as recited in claim 1, wherein said product comprises a production part.

3. The computer implemented method as recited in claim 1, wherein said product comprises a prototype part.

4. The computer implemented method as recited in claim 3, said computer implemented method further comprising:
receiving a cycle time detractor for said fabrication step.

5. The computer implemented method as recited in claim 4, wherein said generating of said cycle time includes said cycle time detractor.

6. The computer implemented method as recited in claim 4, wherein said cycle time multiplier of said prototype part is determined by a priority of said prototype part.

7. A system for determining a product build schedule for sequential fabrication steps, said system comprising:
a routing receiver for said sequential fabrication steps;
a raw process time assignor for a fabrication step in said routing, wherein said raw process time assignor is coupled to said routing receiver;

a cycle time multiplier assignor for said fabrication step, wherein said cycle time multiplier assignor is coupled to said raw process time assignor;

a cycle time generator for said fabrication step, wherein said cycle time generator is coupled to said process time assignor;

a start date receiver for said sequential fabrication steps, wherein said start date receiver is coupled to said cycle time generator; and a projected shipping date computer for said product, wherein said projected shipping date computer is coupled to said start date receiver.

8. The system of claim 7, wherein said product comprises a production part.

9. The system of claim 7, wherein said product comprises a prototype part.

10. The system of claim 9, wherein said system further comprises:

a cycle time detractor receiver, wherein said cycle time detractor is coupled to a cycle time generator for said fabrication step.

11. The system of claim 9, wherein said system further comprises:

a priority determiner, wherein said priority determiner is coupled to said cycle time multiplier assignor for said prototype part.

12. A computer-readable memory containing executable instructions wherein said instructions when executed effect a method for determining a product build schedule for sequential fabrication steps, said method comprising:

receiving a routing of said sequential fabrication steps;

assigning a raw process time to a fabrication step in said routing;

generating a cycle time for said fabrication step;

assigning a cycle time multiplier to said fabrication step;

receiving a start date for said sequential fabrication steps; and computing a projected shipping date for said product.

13. The computer-readable memory as described in claim 12, wherein said product comprises a production part.

14. The computer-readable memory as described in claim 12, wherein said product comprises a prototype part.

15. The computer-readable memory containing executable instructions as described in claim 12, wherein said instructions when executed further effect:

receiving a cycle time detractor for said cycle time.

16. The computer-readable memory containing executable instructions as described in claim 14, wherein said instructions when executed further effect:

receiving a priority for said prototype part.

17. The computer-readable memory containing executable instructions as described in claim 16, wherein said instructions when executed further effect:

said generating a cycle time for said fabrication step further comprises said receiving priority for said prototype part.

* * * * *